US012275015B2

(12) United States Patent
Palladini

(10) Patent No.: US 12,275,015 B2
(45) Date of Patent: Apr. 15, 2025

(54) CONTINUOUS MILL WITH CONTROLLABLE LEVEL

(71) Applicant: CERTECH S.P.A. A SOCIO UNICO, Sassuolo (IT)

(72) Inventor: Alberto Palladini, Castelnovo ne' Monti (IT)

(73) Assignee: CERTECH S.P.A. A SOCIO UNICO, Sassuolo (IT)

( * ) Notice: Subject to any disclaimer, the term of this patent is extended or adjusted under 35 U.S.C. 154(b) by 328 days.

(21) Appl. No.: 17/753,032

(22) PCT Filed: Sep. 4, 2020

(86) PCT No.: PCT/IB2020/058244

§ 371 (c)(1),
(2) Date: Feb. 16, 2022

(87) PCT Pub. No.: WO2021/044355

PCT Pub. Date: Mar. 11, 2021

(65) Prior Publication Data

US 2022/0314230 A1 Oct. 6, 2022

(30) Foreign Application Priority Data

Sep. 5, 2019 (IT) ........................ 102019000015626

(51) Int. Cl.
*B02C 17/18* (2006.01)
*B02C 17/00* (2006.01)
(Continued)

(52) U.S. Cl.
CPC .......... *B02C 17/1805* (2013.01); *B02C 17/04* (2013.01); *B02C 23/36* (2013.01); *B02C 17/00* (2013.01)

(58) Field of Classification Search
CPC .. B02C 17/183; B02C 17/186; B02C 17/1805
See application file for complete search history.

(56) References Cited

U.S. PATENT DOCUMENTS 3,546,821 A * 12/1970 Strom ..................... B24B 31/06 241/46.04
4,325,514 A * 4/1982 Hemingsley ............ B02C 17/16 241/26

(Continued)

FOREIGN PATENT DOCUMENTS

CN 203803576 9/2014
CN 106853405 A 6/2017

(Continued)

OTHER PUBLICATIONS

Chinese Office action issued Jan. 28, 2023, 8 pages.

*Primary Examiner* — Jared O Brown
(74) *Attorney, Agent, or Firm* — Chrisman Gallo Tochtrop LLC

(57) ABSTRACT

A continuous mill, comprising: a casing (1) having a substantially cylindrical shape and rotating about an axis of rotation (X); an inlet opening (2), concentric to the axis of rotation (X); an inlet duct (20), connected to the inlet opening (2); an outlet opening (3), concentric to the axis of rotation (X); an outlet duct (30), connected to the discharge opening (3); a bend (11), arranged along the outlet duct (30), which defines a curve of the outlet duct (30); a regulator (12) associated with the bend (11) and predisposed for varying the position of the bend (11) so as to vary at least the height thereof; a first aeration duct (21), connected to the inlet duct (20), and a second aeration duct (31), connected to the outlet duct (30), wherein the first and second aeration ducts (21, 31) are open to the atmosphere.

4 Claims, 2 Drawing Sheets

(51) Int. Cl.
*B02C 17/04* (2006.01)
*B02C 23/36* (2006.01)

(56) References Cited

U.S. PATENT DOCUMENTS

| | | | | |
|---|---|---|---|---|
| 2009/0010096 | A1* | 1/2009 | Twu | B09B 3/00 366/132 |
| 2018/0290148 | A1 | 10/2018 | Palladini | |

FOREIGN PATENT DOCUMENTS

| | | | | | |
|---|---|---|---|---|---|
| CN | 107413458 | | | 12/2017 | |
| CN | 107486301 | | | 12/2017 | |
| CN | 109317263 | | | 2/2019 | |
| EP | 0074633 | | | 7/1987 | |
| EP | 1690598 | A1 | | 8/2006 | |
| EP | 1880767 | A1 | * | 1/2008 | B02C 17/183 |
| EP | 3397388 | B1 | | 8/2019 | |
| FR | 1455686 | | | 10/1966 | |
| GB | 2191478 | A | * | 12/1987 | B02C 18/0084 |
| IT | UB2015917 | A1 | | 6/2017 | |
| JP | S6354956 | | | 3/1988 | |
| JP | 2000005617 | | | 1/2000 | |
| SU | 442830 | A1 | | 9/1974 | |
| WO | WO-2015059591 | A1 | * | 4/2015 | B02C 17/18 |
| WO | WO-2017089928 | A1 | * | 6/2017 | B02C 17/183 |
| WO | WO-2017115170 | A1 | * | 7/2017 | B02C 17/183 |

* cited by examiner

CONTINUOUS MILL WITH CONTROLLABLE LEVEL

The present invention relates to a controllable-level continuous mill.

For the preparation of ceramic powders it is widely known to use grinding mills comprising a rotating casing which contains a predetermined mass of grinding bodies.

Normally, the substances to be ground to obtain the powders are fed to the mill in aqueous suspension. The rotation of the casing produces the continuous mixing of the grinding bodies which progressively reduce the grain size of the substances in aqueous suspension, up to obtaining a desired grain size.

Mills currently exist which are known as continuous mills, in which the supply and discharge of the liquid suspension take place during the rotation of the casing, without any need for halting. In particular, the supply and discharge take place concentrically to the axis of rotation of the casing.

The applicant has designed and manufactured a particularly effective continuous mill, described in Italian patent application 102015000087853 and in European patent EP3397388. This mill comprises a cylindrical casing rotating about a horizontal axis of rotation. The casing is provided with an inlet opening and an outlet opening, both concentric to the axis of rotation. The mill further comprises a discharge duct, connected to the discharge opening. The discharge duct is equipped with a bend, the height of which can be varied by means of a regulating device. The change in the height of the bend allows the level of liquid inside the mill to be varied.

The variation of the level of liquid inside the mill allows optimising the operation of the mill in relation to the power absorbed and the degree of grinding or refining obtained (understood as the size of the particles obtained at the outlet of the mill).

In particular, the power absorbed by the mill is reduced as the level of liquid increases even above the axis of rotation, as the total centre of gravity of the mass contained in the mill approaches the axis of rotation. In addition, the increase or decrease of the level of liquid allows varying the number of grinding bodies and the flow rate of the processable product.

Thanks to the mill designed by the applicant, which is the subject of the aforementioned patents, the regulations summarised above can be made without the need to halt the mill, or they can be made substantially during the normal operation of the mill.

The applicant has found that, although extremely effective, the current mill can be improved from the point of view of the accuracy of the liquid level regulation. In particular, the applicant has found that the level of liquid inside the mill may fluctuate to a certain extent.

The object of the present invention is therefore to offer a technical solution which improves the accuracy of the level regulation in the continuous mill described briefly above.

Features and advantages of the present invention will more fully emerge from the following detailed description of an embodiment of the present invention, as illustrated in a non-limiting example in the accompanying figures, in which.

Figure 1:
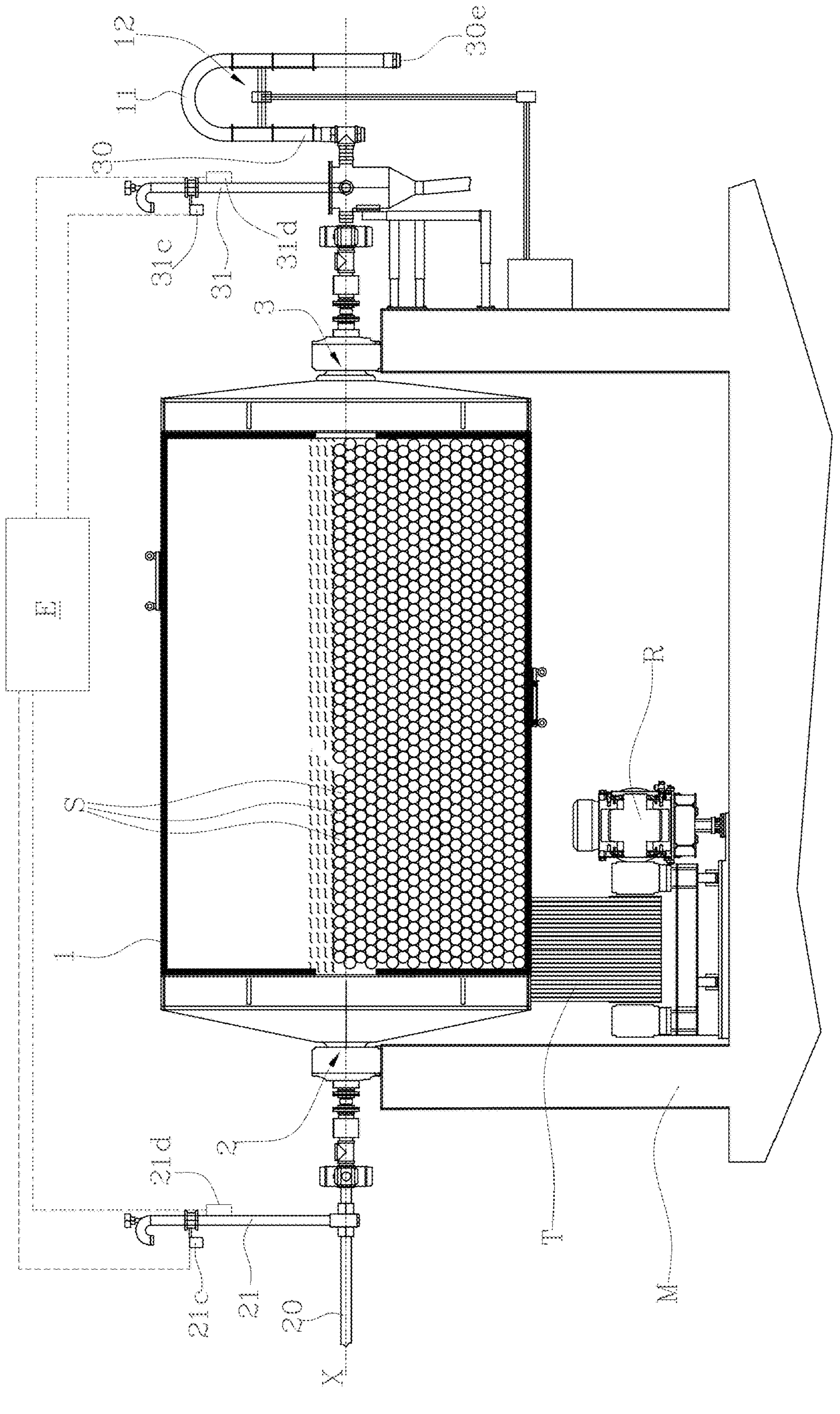
FIG. 1 shows a schematic view, in partial section, of a continuous mill according to the present invention.

The mill according to the present invention comprises a casing (1) having a substantially cylindrical shape and rotating about an axis of rotation (X). The rotation of the casing is achieved by the operation of actuators known to the person skilled in the art and illustrated only schematically in FIG. 1. For example the rotation of the casing (1) can be obtained by means of a motor (R) connected to the casing (1) via a transmission belt (T). The casing (1) rotates by means of flanges (F) (not illustrated in detail) which are concentric to the axis of rotation (X) and rotatably associated to supports solidly constrained to a base of the mill (M).

The casing (1) is provided with an inlet opening (2), for supplying the substance to be processed, and an outlet opening (3), for the discharge of the processed substance.

As is known, the casing (1), in working conditions of the mill, contains a predetermined mass of grinding bodies (S) which, during the rotation of the casing (1), drag and impact against one another, producing the milling of the substance to be processed.

The inlet opening (2) and the outlet opening (3) are concentric to the axis of rotation (X). As is known in the field, this allows supplying the substance to be processed during the rotation of the casing (1), i.e., without having to halt the casing (1). The inlet and outlet openings (2,3) are preferably obtained through the flanges (F) of the casing (1).

An inlet duct (20) is connected to the inlet opening (2) for supplying the material to be processed.

An outlet duct (30) is connected to the outlet opening (3) of the mill (M). The outlet duct (30) is provided with an outlet end (30*e*) predisposed to be located at a lower height than the height of the outlet opening (3). In this way the discharge of the liquid contained inside the casing (1) can take place by force of gravity, i.e., according to the principle of communicating vessels.

The device further comprises a bend (11), arranged along the outlet duct (30), which defines a curve of the same outlet duct (30). In other terms, the bend (11) defines an elbow, having a more or less sharp curvature, along the outlet duct (30). The bend (11) might have a curved and continuous conformation, as shown in FIG. 1, or might have a different conformation, for example it might have the shape of an angled fitting between two consecutive portions of the outlet duct (30). The fitting might for example be V-shaped or L-shaped.

The bend (11) is arranged with the concavity thereof facing downwards.

The discharging device further comprises a regulator (12) associated to the bend (11) and predisposed for varying the position of the bend (11) so as to vary at least the height thereof.

The bend (11), by means of the regulator (12), can be located at a greater height with respect to the outlet opening (3) and to the outlet end (30*e*) of the outlet duct (30). In this way, during the filling step of the casing (1), the bend (11) defines the maximum level which the liquid can reach inside the casing (1). During the filling of the casing (1), the liquid flows through the outlet opening (3) also inside the outlet duct (30) up to the height of the bend (11) from which it proceeds towards the outlet end (30*e*). In other terms the level of liquid inside the casing (1) cannot exceed the height of the bend (11).

The use of the bend (11) and the regulator (12) thus enables regulating the level of liquid inside the casing (1).

Figure 2:
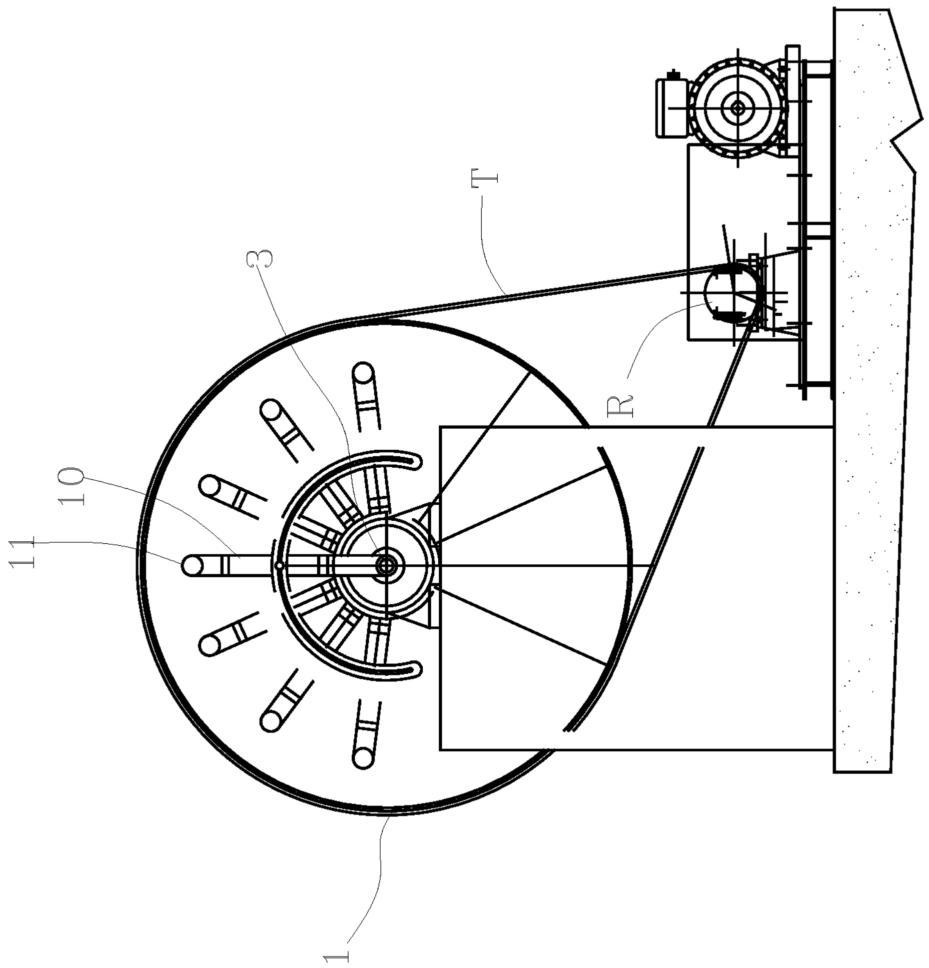
FIG. 2 shows a schematic view from the left of the continuous mill of FIG. 12.

In a particularly effective embodiment, the regulator (12) is structured for rotating at least one intermediate portion of the outlet duct (30) comprising the bend (11) about an axis of rotation (X). In this embodiment the axis of rotation (X) of the regulator (12) coincides with the axis of rotation (X) of the casing (1). As schematically illustrated in FIG. 2, the rotation of the intermediate portion of the outlet duct (30) enables varying the height of the bend (11). Overall, at least up to a position in which it is at the same height as the outlet opening (3), the bend (11) faces the concavity thereof in a downwards direction.

To facilitate the rotation, the outlet duct (30) comprises at least one terminal portion which is flexible, or it is entirely flexible. For example, the outlet duct (30), comprising the bend (11), can be made of rubber or another material which makes the structure thereof flexible. For example, in order to enable easy rotation, at least one portion of the outlet duct (30), comprised between the outlet opening (30*e*) and the height of the axis of rotation (X), downstream of the bend (11), can be flexible.

The regulator (12) comprises an actuator, predisposed so as to rotatingly activate the intermediate portion of the outlet duct (30) comprising the bend (11) about the axis of rotation (X). This optional actuator has not been illustrated in detail as it is within the scope of knowledge of the person skilled in the art. Alternatively the regulator (12) can be manually activated, for example by acting directly on the bend (11) or on the portion of outlet duct (30) adjacent to the bend (11), for producing the rotation of the bend (11) about the axis of rotation (X). A blocking mechanism can be predisposed for blocking the position of the bend (11) at a desired height. This blocking mechanism has not been illustrated in detail as it is within the scope of knowledge of the person skilled in the art. For example, it is possible to use a rod, provided with a plurality of notches or niches for jointing, which can be rotatably connected to the bend (11) at an end thereof.

The mill according to the present invention comprises a first aeration duct (21), connected to the inlet duct (20), and a second aeration duct (31), connected to the outlet duct (30). The first and second aeration ducts (21,31) are open to the atmosphere.

In essence, the first aeration duct (21) branches from the inlet duct (20), i.e., it is connected to the inlet duct (20) at a first end, while at a second end it is open. Similarly, the second aeration duct (31) branches from the outlet duct (30), i.e., it is connected to the outlet duct (30) at a first end, while at a second end it is open. The second aeration duct (31) is located upstream of the bend (11) with respect to the flow direction of the material, i.e., it is interposed between the discharge opening (3) and the bend (11).

Both the first and second aeration ducts (21,31) are provided with a respective control valve (21*c*,31*c*), each of which is operable between an open and a closed configuration.

In the mill filling step, the control valves are kept in the closed configuration. The level of liquid inside the mill rises to a level corresponding to the height of the bend (11). Once the desired level is reached, the control valves (21*c*,31*c*) are operated in the open configuration. With the control valves (21*c*,31*c*) in the open configuration, the liquid present inside the mill is arranged and maintained stably at the same level both inside the mill and inside the aeration ducts (21,31), and therefore also inside the mill, without undergoing significant fluctuations. The control valves can be manually or automatically operated.

Advantageously, each aeration duct (21,31) may be provided with a level probe (21*d*, 31*d*). Each level probe (21*d*, 31*d*) is connected to a control module (E), which controls the control valves (21 *c*,31 *c*).

The control module (E) is predisposed for detecting a signal, transmitted by the level probes (21*d*, 31*d*), indicative of the level of liquid present inside the aeration ducts (21,31). The control module (E) is further predisposed for maintaining the control valves (21 *c*,31 *c*) in the closed configuration up to the achievement of a predetermined level of liquid inside the aeration ducts (21,31), and for operating the control valves in the open configuration up to the achievement of the predetermined level of liquid, detected by the level probes (21*d*, 31*d*), inside the aeration ducts.

Advantageously, the control module (E) can possibly also be connected to the regulator (12), to control the height of the bend (11). In this case, a desired level of liquid inside the mill can be communicated to the control module (E) via an interface of a known type. Once the level of liquid is set, the control module (E) implements a mill filling sequence, in which the height of the bend (11) is regulated, the control valves (21 *c*,31 *c*) are closed and the liquid filling is started. Once the predetermined level of liquid has been reached, detected by means of the level probes (21*d*, 31*d*), the control module opens the control valves (21 *c*,31 *c*). Subsequently, during normal operation of the mill, the control module (E) receives the level signal from the level probes (21*d*, 31*d*), and opens or closes the control valves as necessary, possibly modifying the height of the bend (11).

Thanks to the presence of the aeration ducts (21,31) the continuous mill allows controlling the level of liquid inside the rotating casing in an extremely precise and stable manner. This makes it possible to control the grinding process carried out by means of the mill in an equally precise and stable manner.

The invention claimed is:

1. A continuous mill, comprising:

a casing (1) having a substantially cylindrical shape and rotating about an axis of rotation (X);

an inlet opening (2), concentric to the axis of rotation (X);

an inlet duct (20), connected to the inlet opening (2);

an outlet opening (3), concentric to the axis of rotation (X);

an outlet duct (30), connected to the outlet opening (3);

a bend (11), arranged along the outlet duct (30), which defines a curve of the outlet duct (30);

a regulator (12) associated with the bend (11) and predisposed for varying the position of the bend (11) so as to vary at least a height thereof;

wherein the continuous mill comprises a first aeration duct (21), connected to the inlet duct (20), and a second aeration duct (31), connected to the outlet duct (30), wherein the first and the second aeration ducts (21,31) are open to the atmosphere, wherein the first aeration duct (21) is provided with a control valve and, at a first end, is connected to the inlet duct (20), while at a second end the first aeration duct is open, and wherein the second aeration duct (31) is located upstream of the bend (11) and is provided with a control valve and, at a first end, is connected to the outlet duct (30), while at a second end the second aeration duct is open, wherein the first and the second aeration ducts (21,31) are each provided with a level probe, predisposed for detecting a level of liquid inside the first and the second aeration ducts (21,31).

2. The continuous mill according to claim 1, comprising a control module, connected to the level probes and the control valves (21*c*,31*c*), which is predisposed: for detecting a signal, transmitted by the level probes, indicative of the level of liquid present inside the aeration ducts (21,31); for maintaining the control valves (21*c*,31*c*) in a closed configuration up to an achievement of a predetermined level of liquid inside the aeration ducts (21,31), and for operating the control valves in an open configuration up to the achievement of a predetermined level of liquid, detected by the level probes, inside the aeration ducts.

3. The continuous mill according to claim 2, wherein the control module is connected to the regulator (12), for controlling the height of the bend (11).

4. The continuous mill according to claim 1, wherein the regulator (12) is structured to rotate at least an intermediate portion of the outlet duct (30) comprising the bend (11) about an axis of rotation (X).

* * * * *